(12) United States Patent
Ihara

(10) Patent No.: US 8,379,909 B2
(45) Date of Patent: Feb. 19, 2013

(54) IMAGE PROCESSING APPARATUS AND COMPUTER READABLE MEDIUM

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1025 days.

(21) Appl. No.: 12/198,549

(22) Filed: Aug. 26, 2008

(65) Prior Publication Data

US 2009/0220164 A1 Sep. 3, 2009

(30) Foreign Application Priority Data

Feb. 28, 2008 (JP) .................. 2008-047531

(51) Int. Cl.
*G06K 9/00* (2006.01)
(52) U.S. Cl. ............................................. 382/100
(58) Field of Classification Search .................. 382/100; 380/243
See application file for complete search history.

(56) References Cited

U.S. PATENT DOCUMENTS

| 6,580,804 | B1 | 6/2003 | Abe |
| 6,654,501 | B1 | 11/2003 | Acharya et al. |
| 2005/0018845 | A1* | 1/2005 | Suzaki ........................... 380/243 |
| 2005/0180596 | A1 | 8/2005 | Abe et al. |
| 2007/0092103 | A1 | 4/2007 | Mihcak et al. |
| 2007/0183626 | A1 | 8/2007 | Hashimoto et al. |

FOREIGN PATENT DOCUMENTS

| JP | A-2002-232698 | 8/2002 |
| JP | A-2003-101762 | 4/2003 |
| JP | A-2006-222572 | 8/2006 |
| JP | A-2007-311888 | 11/2007 |
| WO | WO 2007/003008 A1 | 1/2007 |

OTHER PUBLICATIONS

Australian Office Action dated Jan. 29, 2010 for Australian Patent Application No. 2008212076.
Korean Office Action issued in Korean Patent Application No. 10-2008-0090103 dated Oct. 25, 2010 (with translation).
Chinese Office Action dated Dec. 22, 2010 in corresponding Chinese Patent Application No. 200810161202.9 (with translation).
Japanese Office Action issued in Japanese Patent Application No. 2008-047531 issued on Feb. 2, 2010 (with English translation).
Tsujiai, "Digital Watermark in Lettering Images by Using Character Shape," The Transactions of the Institute of Electronics, 1999, pp. 2175-2177, vol. J82-D-11, No. 11, The Institute of Electronics, Japan (with partial English translation).

* cited by examiner

*Primary Examiner* — Claire X Wang
(74) *Attorney, Agent, or Firm* — Oliff & Berridge, PLC

(57) ABSTRACT

An image processing apparatus includes: an image accepting unit that accepts an image; a pixel addition unit that specifies a reference pixel for reference based a demarcation, with each area of object within the image accepted by the image accepting unit or each sub-area into which the area is divided as the demarcation, and that adds a pixel at a position independent from a cluster of pixels within the image on the basis of the reference pixel; and an output unit that outputs the image to which the pixel is added by the pixel addition unit.

18 Claims, 11 Drawing Sheets

IMAGE PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2008-047531 filed Feb. 28, 2008.

BACKGROUND

1. Technical Field

The present invention relates to an image processing apparatus and a computer readable medium.

2. Related Art

A technique for embedding relevant additional information into the contents (image) while keeping the quality of contents is called digital watermarking.

Herein, embedding information into the image means altering the image in accordance with the information, in which the altered image can be read by a scanner to take out the embedded information from that image through the image processing.

SUMMARY

According to an aspect of the present invention, an image processing apparatus includes: an image accepting unit that accepts an image; a pixel addition unit that specifies a reference pixel for reference based a demarcation, with each area of object within the image accepted by the image accepting unit or each sub-area into which the area is divided as the demarcation, and that adds a pixel at a position independent from a cluster of pixels within the image on the basis of the reference pixel; and an output unit that outputs the image to which the pixel is added by the pixel addition unit.

BRIEF DESCRIPTION OF THE DRAWINGS

Exemplary embodiment of the present invention will be described in detail based on the following figures, wherein.

DETAILED DESCRIPTION

The preferred embodiments for carrying out the present invention will be described below with reference to the drawings.

Figure 1:
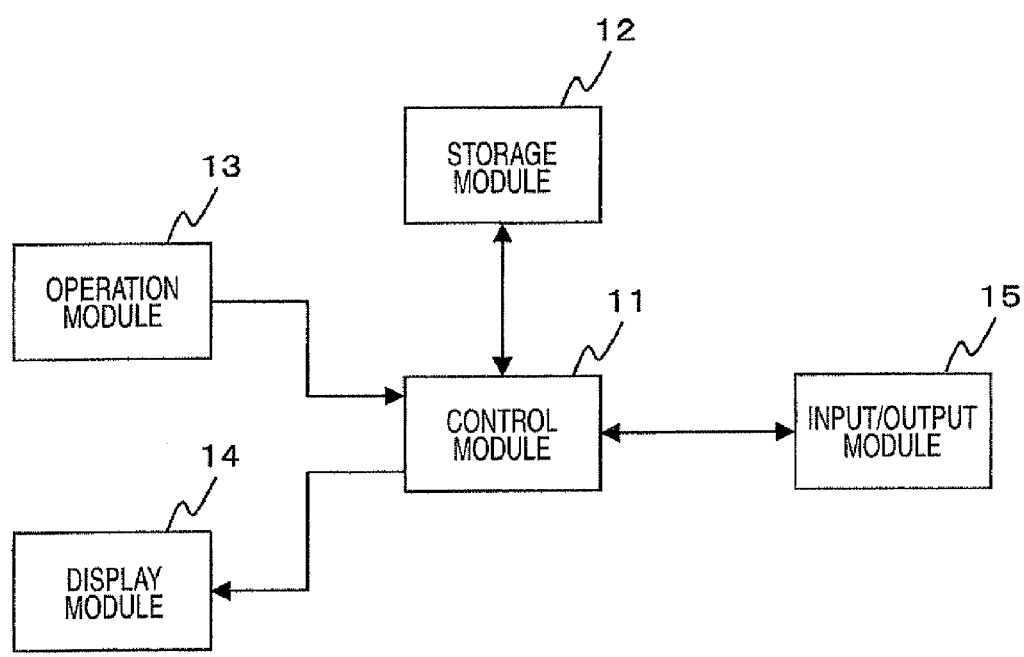
FIG. 1 is a conceptual module block diagram of a configuration example according to a first embodiment.

FIG. 1 is a conceptual module block diagram of a configuration example according to a first embodiment.

A module generally refers to a part of software (computer program) or hardware that is logically separable. Accordingly, the module in this embodiment is not only the module in the computer program, but also the module in the hardware configuration. Therefore, the embodiment also serves to describe the computer program, system and method. By way of explanation, the terms "% store", "stored", and their equivalent wordings are used, but these wordings mean storing or being stored in a storage device, or controlling to store or be stored in the storage device in the embodiment for the computer program. Also, the module corresponds almost one-to-one to the function, but in the implementation, one module may be composed of one program, a plurality of modules may be composed of one program, or conversely one module may be composed of a plurality of programs. Also, a plurality of modules may be executed on one computer, or one module may be executed on a plurality of computers in the distributed or parallel environment. One module may contain another module. In the following, the term "connection" means both the physical connection and the logical connection (for exchange of data, instruction, or reference relationship between data).

Also, the system or apparatus is composed of a plurality of computers, hardware, or devices that are connected by communication means such as a network (including one-to-one communication connection), or composed of one computer, hardware or devices. The "apparatus" and "system" are used as synonymous terms.

The image to embed information (image data to be processed) may be binary image, color image or many-valued image. In the following, the information to be embedded is also called additional information. The term "predetermined" as used herein means "determined beforehand" or "determined according to a situation at that time or up to that time".

This embodiment has a control module 11, a storage module 12, an operation module 13, a display module 14 and an input/output module 15, as shown in FIG. 1.

The control module 11, which is connected to the storage module 12, the operation module 13, the display module 14 and the input/output module 15, operates in accordance with an image processing program stored in the storage module 12, and performs a process for embedding additional information into image data of processing object. The control module performs this process by controlling, or in cooperation with the storage module 12, the operation module 13, the display module 14 and the input/output module 15. The specific contents of this process will be described later in detail.

The storage module 12, which is connected to the control module 11, comprises a computer readable recording medium for holding a program executed by the control module 11. This storage module 12 also operates as a work memory that stores various kinds of data occurring in the course of the image processing by the control module 11.

The operation module 13, which is connected to the control module 11, controls a keyboard or a mouse to accept an operation of the user and output the operation contents to the control module 11.

The display module 14, which is connected to the control module 11, controls a display to present information to the user in accordance with an instruction inputted from the control module 11.

The input/output module 15, which is connected to the control module 11, inputs data inputted from an external apparatus such as a scanner into the storage module 12, or outputs image data to an external apparatus such as a printer in accordance with an instruction from the control module 11.

Herein, the specific contents of the processes performed by the control module 11 will be described below.

The control module 11 stores image data inputted from the input/output module 15, namely, image data of processing object, in the storage module 12, and performs the following process to embed additional information into this image data.

Figure 2:
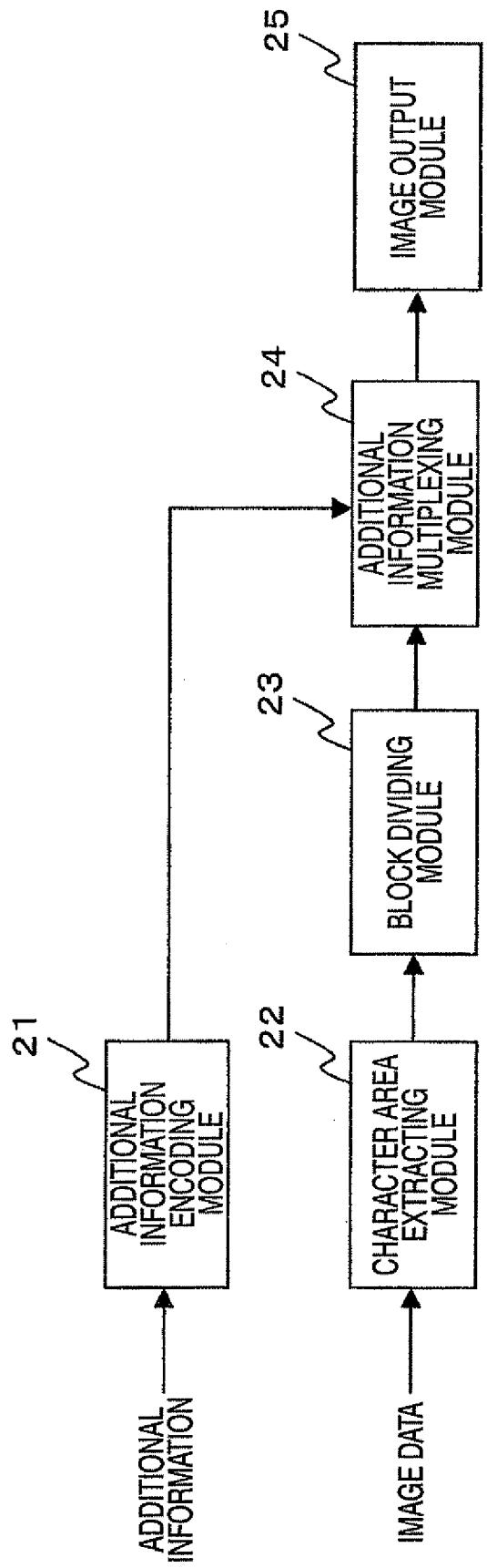
FIG. 2 is a conceptual module block diagram of a functional configuration example of a control module.

FIG. 2 is a conceptual module block diagram of a functional configuration example of the control module 11. That is, the process is performed by the control module 11 functionally comprising an additional information encoding module 21, a character area extracting module 22, a block dividing module 23, an additional information multiplexing module 24 and an image output module 25, as shown in FIG. 2. Herein, the operation of accepting an image, specifying a reference pixel for reference based on a demarcation, with each area of object within the accepted image or each sub-area into which the area is divided as the demarcation, and adding a pixel at a position independent from a cluster of pixels within the image on the basis of the reference pixel is performed by the character area extracting module 22, the block dividing module 23 and the additional information multiplexing module 24, for example.

The additional information encoding module 21, which is connected to the additional information multiplexing module 24, encodes the additional information with a predetermined error correcting code, and passes the encoded additional information to the additional information multiplexing module 24. Though any encoding method may be employed, a block code such as a BCH code or a Reed-Solomon code is suitable.

The character area extracting module 22, which is connected to the block dividing module 23, accepts image data, extracts a partial area judged as the character area from the image data, and passes the extracted partial area to the block dividing module 23. For example, the partial area may be rectangular, and extracted by calculating the coordinates at four corners. The extraction of the partial area judged as the character area is specifically made by firstly extracting the area composed of binary values of black and white based on the number of colors, further projecting the area to check whether or not the white ground area indicating the space between lines exists almost regularly in the area, and extracting the partial area regularly existing as the character area.

The block dividing module 23, which is connected to the character area extracting module 22 and the additional information multiplexing module 24, divides the character area extracted by the character area extracting module 22 into a predetermined block size, and passes the divided blocks to the additional information multiplexing module 24. More specifically, the blocks are allocated successively from the upper left corner of the character area, and the block is not allocated at the right end or lower end where the block is beyond the character area, for example.

The additional information multiplexing module 24, which is connected to the additional information encoding module 21, the block dividing module 23, and the image output module 25, adds the black pixel representing the additional information at a position independent from the black pixel within the block, based on the additional information received from the additional information encoding module 21 and the black pixel for reference within the block received from the block dividing module 23. Also, this process may be performed for each sub-area (block) into which the area of object is divided. More specifically, information is taken out bit by bit from the top of a code series of the additional information passed from the additional information encoding module 21 and embedded into the block divided by the block dividing module 23 successively in the direction from upper left to lower right, and the block (image) into which the additional information is embedded is passed to the image output module 25, for example. The block in which the number of black pixels within the block is less than a predetermined number is skipped without embedding information. Also, the term "position independent from the black pixel" means the isolated position out of contact with the black pixel and other black pixels. A processing example of the additional information multiplexing module 24 will be described later in detail using FIGS. 4 and 5.

Also, the additional information multiplexing module 24 may directly receive the image data, or receive the character image from the character area extracting module 22, specify the black pixel for reference from the original image, based on area of object within the received image, for example, every cluster of pixels or every plural clusters of pixels, and have the specified black pixel as the black pixel for reference. Herein, the cluster of pixels may be a group of black pixels connected at four or eight connections, or the character image. The area of object for every cluster of pixels or every plural clusters of pixels is exemplified in the following.

Also, the additional information multiplexing module 24 may decide the position of the black pixel to be added as the relative position to the reference pixel for reference (e.g., upper or lower direction) or based on the distance from the black pixel for reference.

The image output module 25, which is connected to the additional information multiplexing module 24, outputs the image to which the black pixel is added by the additional information multiplexing module 24. More specifically, the image output module 25 controls the printer to print the image into which the additional information is embedded via the input/output module 15, for example.

Figure 3:
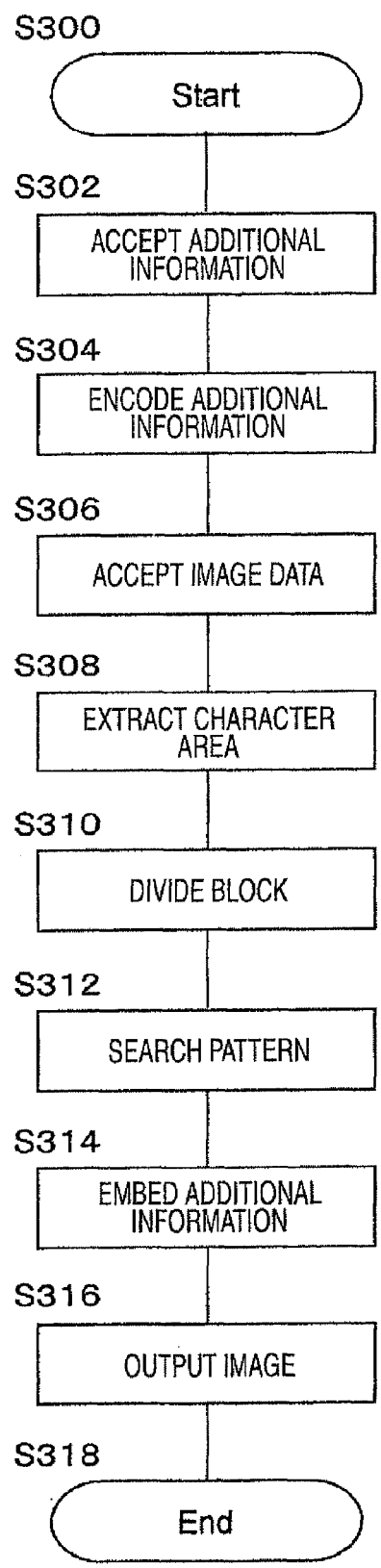
FIG. 3 is a flowchart showing a processing example according to the first embodiment.

Referring to a flowchart as shown in FIG. 3, a processing example of the first embodiment will be described below.

At step S302, the additional information encoding module 21 accepts the additional information to be embedded.

At step S304, the additional information encoding module 21 encodes the additional information accepted at step S302.

At step S306, the character area extracting module 22 accepts image data of object to embed information.

At step S308, the character area extracting module 22 extracts the character area from the image data accepted at step S306.

At step S310, the block dividing module 23 divides the character area extracted at step S308 into blocks.

At step S312, the additional information multiplexing module 24 performs a pattern search of the inside of block divided at step S310. This pattern search decides the position to add the black pixel representing the additional information by searching the inside of block for pattern.

At step S314, the additional information multiplexing module 24 adds the black pixel (or plural black pixels, referred to as "information image" in the following) representing the additional information to the original image based on the position of search result at step S312. The processing example at step S312 and step S314 will be described later in detail using FIGS. 4 and 5.

At step S316, the image output module 25 outputs the image to which the information image is added at step S314.

The processing at step S302 and step S304 needs to be made before step S314, but is not necessarily made before step S306 as shown in the flowchart of FIG. 3, or the processing may be performed in parallel with steps S306 to S312.

FIG. 4 is an explanatory view showing an example of the position of black pixel representing information to be embedded into the image. That is, the processing at steps S312 and S314, which is performed by the additional information multiplexing module 24, will be described below.

Figure 4A:
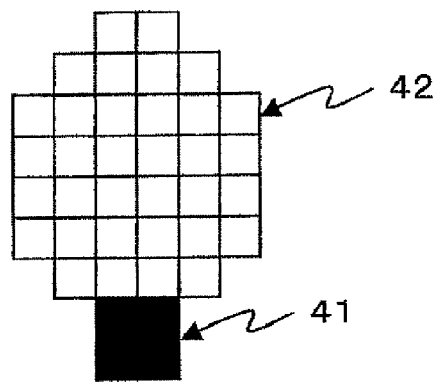
FIG. 4 is an explanatory view showing an example of the position of black pixel representing information embedded into the image.
Figure 4B:
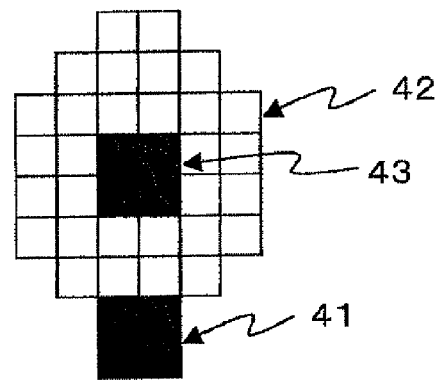

If the additional information to be embedded is "1", a pattern (i.e., a pattern composed of a partial character 41 and a white area 42) as shown in FIG. 4A is searched from the image within the block of object, and if found, plural pixels (applicable pixels 43) in the central part of the original image are reversed from white to black, as shown in FIG. 4B. The applicable pixels 43 become an information image. And the operation transfers to the processing for the next block. If the pattern as shown in FIG. 4A is not found, the operation does not do anything and transfers to the processing for the next block.

Figure 4C:
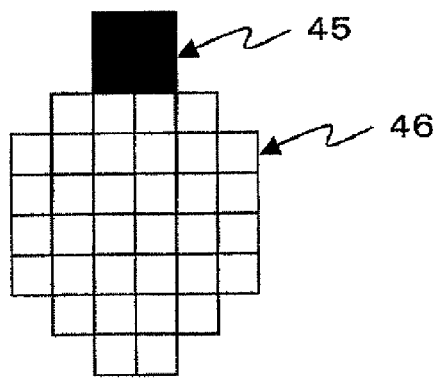
Figure 4D:
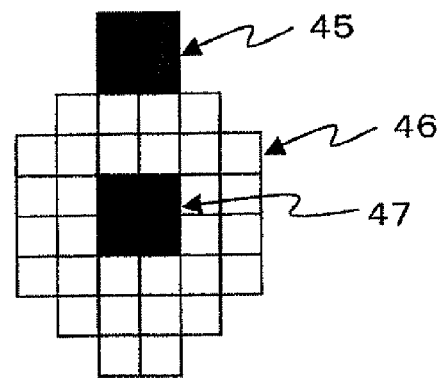

If the additional information to be embedded is "0", a pattern (i.e., a pattern composed of a partial character 45 and a white area 46) as shown in FIG. 4C is searched from the image within the block of object, and if found, plural pixels (applicable pixels 47) in the central part of the original image are reversed from white to black, as shown in FIG. 4D. The applicable pixels 47 become an information image. And the operation transfers to the processing for the next block. If the pattern as shown in FIG. 4C is not found, the operation does not do anything and transfers to the processing for the next block.

The information image is independent black pixels. The independent black pixel refer to the black pixel not within the black image of the original image, but at the separate position out of contact with the black image of the original image, in which the independent black pixel may be composed of one or more pixels.

In either case where the pattern as shown in FIG. 4A or 4C is found and the information image corresponding to "1" or "0" can be added, or where the pattern is not found and the information image can not be added, the bits of the next additional information are embedded into the next block. That is, if the independent black pixel can not be hit within the block, the bits of the corresponding additional information are not embedded, and are missing, although there is no problem if the additional information is encoded in the error correcting system with an appropriate parameter.

In this process, if the additional information to be embedded is "1", the nearest character component pixel (partial character 41) in the vertical direction (upward or downward) is located downward, with the information image (applicable pixels 43) to be newly embedded as the base point. Conversely, if the additional information to be embedded is "0", the character component pixel (partial character 45) nearest to the information image (applicable pixels 47) to be newly added in the vertical direction (upward or downward) is located upward. On the contrary, in detecting the embedded additional information, the independent black pixel (information image) is firstly detected, and the additional information is detected according to whether the distance between the black pixel and the character component pixel in the vertical direction is shorter in the up or down direction.

Though the size of independent black pixel (information image) to be added is 2×2 pixels in the example as shown in FIG. 4, if the independent black pixel has the size of 3×3 pixels at a resolution of about 600 dpi, they are almost invisible to man's eyes. Also, it is desirable that the periphery of independent black pixel to be added is surrounded by a few white pixels at a resolution of about 600 dpi to avoid connection with the character component pixel, when copied multiple times.

Figure 5:
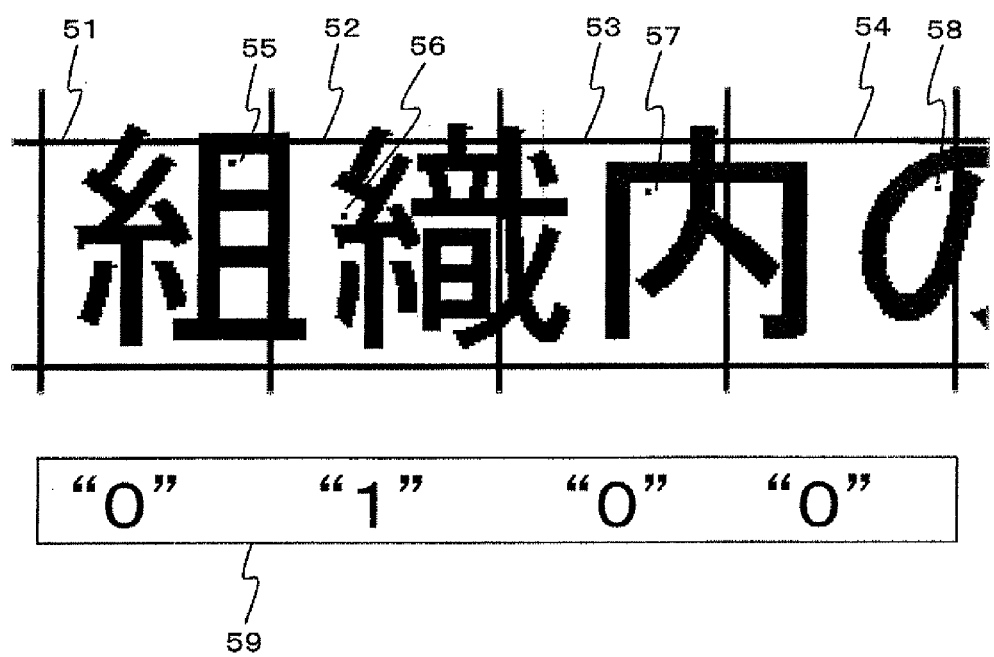
FIG. 5 is an explanatory view showing an example of image into which additional information is embedded.

FIG. 5 is an explanatory view showing an example of the image into which the additional information is embedded. That is, the character image into which the additional information is embedded is illustrated, as previously described.

This character image has the additional information of 4 bits of "0100" embedded. That is, an information image 55 exists within a block 51, and the character component pixel nearest to this information image 55 in the vertical direction is located upward. Accordingly, it is found that "0" is added to the block 51. An information image 56 exists within a block 52, and the character component pixel nearest to this information image 56 in the vertical direction is located downward. Accordingly, it is found that "1" is added to the block 52. Similarly, an information image 57 exists within a block 53 and an information image 58 exists within a block 54, and the character component pixels nearest to the information image 57 and the information image 58 in the vertical direction are located upward. Accordingly, it is found that "0" is added to the block 53 and "0" is added to the block 54.

A second embodiment will be described below.

Figure 6:
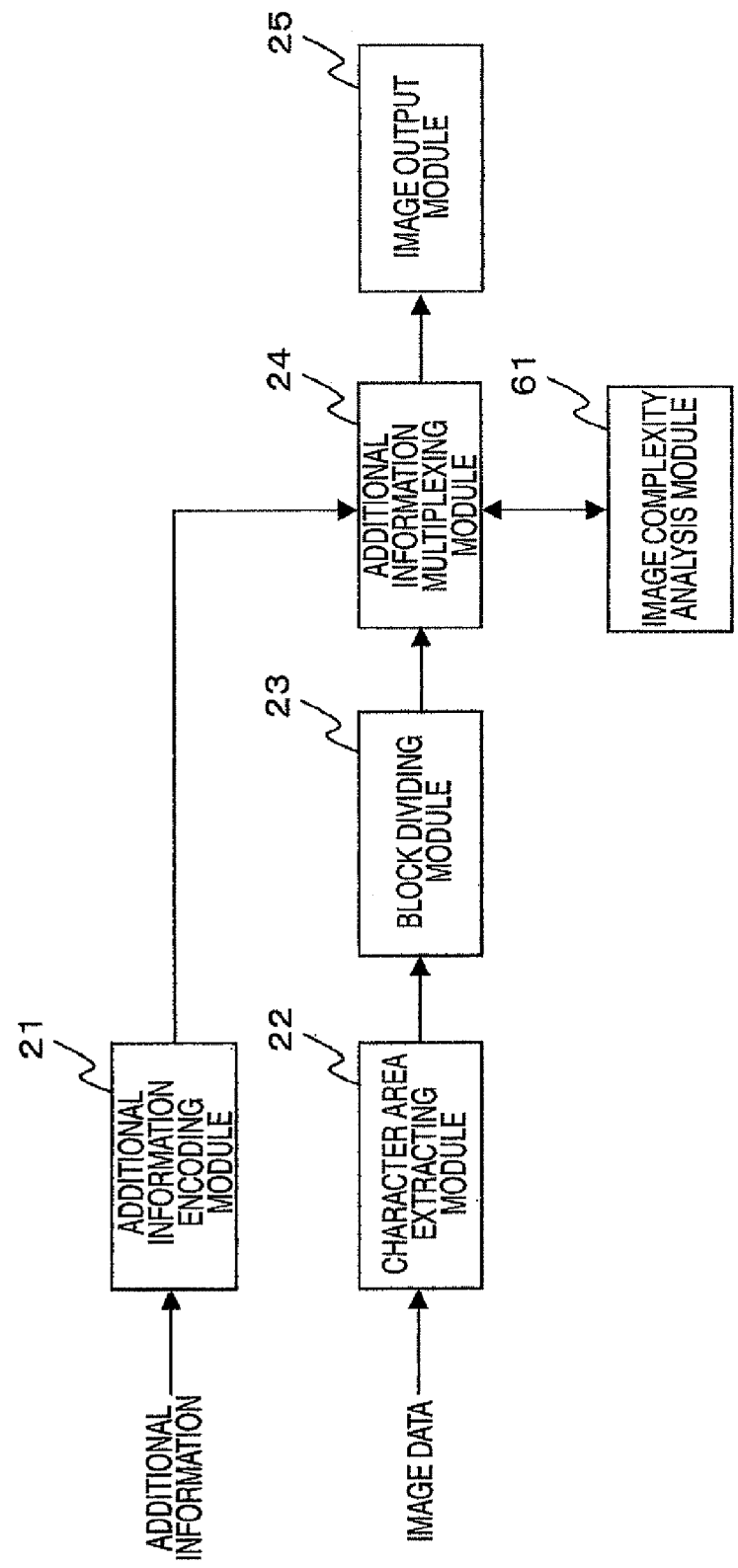
FIG. 6 is a conceptual module block diagram of a functional configuration example according to a second embodiment.

A conceptual module organization of a configuration example of the second embodiment is the same as the first embodiment shown in FIG. 1. FIG. 6 is a conceptual module block diagram of a functional configuration example of the control module 11 according to the second embodiment. The same or like parts are designated by the same numerals as in the first embodiment, and not described again.

The second embodiment comprises an additional information encoding module 21, a character area extracting module 22, a block dividing module 23, an additional information multiplexing module 24, an image output module 25, and an image complexity analysis module 61.

The differences from the first embodiment are picked up for explanation. The additional information multiplexing module 24 is connected to the additional information encoding module 21, the block dividing module 23, the image output module 25 and the image complexity analysis module 61, and the image complexity analysis module 61 is connected to the additional information multiplexing module 24.

The second embodiment aims at embedding the additional information in a format with less degraded image quality, in which the image complexity analysis module 61 is newly added to the configuration of the control module 11 as shown in FIG. 6.

The additional information multiplexing module 24 decides the positions of adding the black pixel, based on the complexity calculated by the image complexity analysis module 61, if there are plural positions of adding the black pixel. That is, for example, if there are plural positions to which the independent black pixel can be added, the image complexity around the positions is inquired from the image complexity analysis module 61, and the independent black pixel is added to the position having the highest complexity. Also, the additional information multiplexing module 24 may decide whether or not to the black pixel, based on the complexity calculated by the image complexity analysis module 61.

The image complexity analysis module 61 calculates the complexity for each character area of object in the image or each block within the character area. The complexity of image means the extent indicating the crowdedness or entanglement of the image, and is used to specify the position of adding the black pixel representing the information to be added. That is, for example, in receiving an inquiry from the addition information multiplexing module 24, the total number of alternations (number of switching from black to white or from white to black) in the longitudinal direction and the lateral direction is computed for the peripheral area around that position, and defined as the degree of complexity. More specifically, supposing that the size of the peripheral area is 25 pixels×25 pixels, the number of alternations is firstly computed for every 25 rows, and added. Then, the number of alternations is computed for every 25 columns, and added. The number in the column direction and the number of alternations in the row direction are added to have the image complexity. For the calculation of the image complexity, the frequency may be calculated using an FFT. And at a predetermined frequency or more in a frequency space, the image complexity is said to be high.

The block dividing module 23 may recognize the character image within the character area extracted by the character area extracting module 22. That is, for example, the block dividing module 23 may make the character recognition, and pass the character image as the black pixel cluster and its recognition result (character code) as the character recognition result to the additional information multiplexing module 24.

And in this case, the image complexity analysis module 61 may receive the character recognition result by the module dividing module 23 from the additional information multiplexing module 24, and calculate the image complexity, based on the character recognition result. For example, the complexity may be calculated in advance in accordance with the character code; and decided from the character code of the recognition result.

Figure 7:
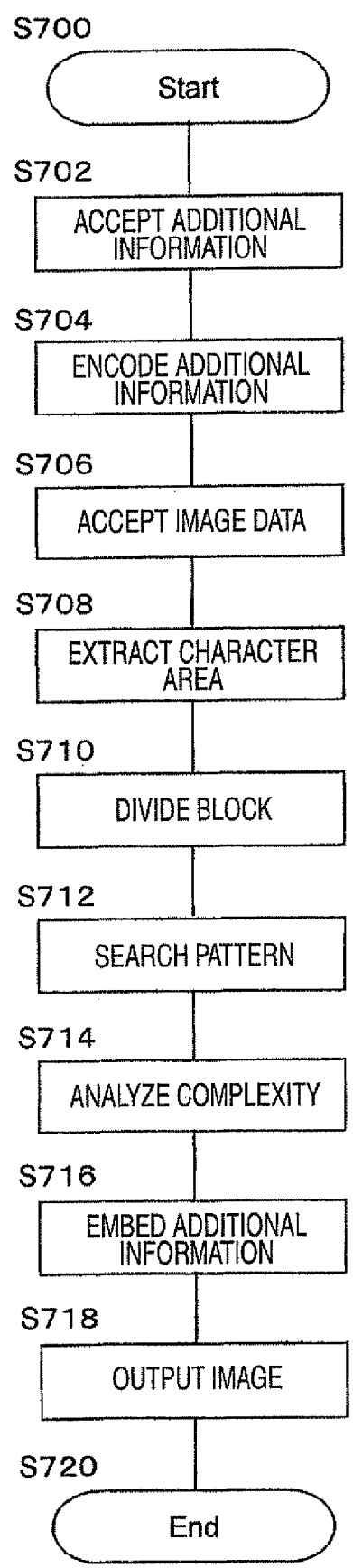
FIG. 7 is a flowchart showing a processing example according to the second embodiment.

Referring to a flowchart as shown in FIG. 7, a processing example of the second embodiment will be described below.

The steps S702 to S710 are the same steps S302 to S310 in the flowchart as shown in FIG. 3.

At step S712, the pattern is searched in the same way as at step S312 in the flowchart as shown in FIG. 3, and multiple results of search are found. If there is no applicable pattern or one applicable pattern, the processing at step S714 is not performed.

At step S714, the image complexity analysis module 61 analyzes the complexity of the block or character image.

At step S716, the additional information multiplexing module 24 adds the information image to the position to add the information image among those found at step S712, based on the complexity of analysis result at step S714.

At step S718, the image to which the information image is added is outputted in the same way as at step S316.

A third embodiment will be described below.

A conceptual module organization of a configuration example of the third embodiment is the same as the first embodiment shown in FIG. 1. A conceptual module organization of a functional configuration example of the control module 11 according to the third embodiment is the same as the first embodiment shown in FIG. 2.

The differences from the first embodiment are picked up for explanation. In the third embodiment, the additional information is decoded more easily, and the configuration of the control module 11 is the same as shown in FIG. 2, except that the additional information multiplexing module 24 selects the position for embedding not to overlap the block (e.g., position near the center of the block) among from plural extracted positions, if plural independent positions (reference pixel positions) capable of adding the black pixel within the block are extracted. Thereby, for example, if the selected position is near the center of the block, the independent black pixel is added to the position sufficiently away from the peripheral part of the block, whereby even if there is more or less error (a difference in the divided block between the time of embedding the additional information and the time of extracting the additional information) in the estimation of the divided block position when extracting the additional information, the possibility that two independent dots are included within one divided block is reduced.

Figure 8:
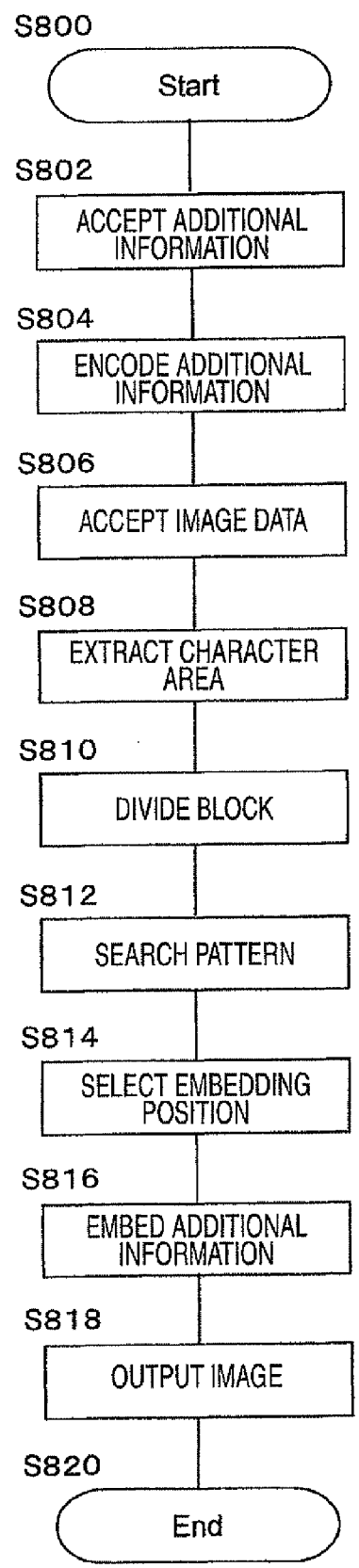
FIG. 8 is a flowchart showing a processing example according to a third embodiment.

Referring to a flowchart as shown in FIG. 8, a processing example of the third embodiment will be described below.

The steps S802 to S810 are the same steps S302 to S310 in the flowchart as shown in FIG. 3.

At step S812, the pattern is searched in the same way as at step S312 in the flowchart as shown in FIG. 3, and multiple results of search are found. If only one pattern is found as the result of search, the processing at step S814 may not be performed.

At step S814, the additional information multiplexing module 24 selects the position near the center of the block of object as the embed position of additional information from among the positions of pattern searched at step S812.

At step S316, the additional information multiplexing module 24 adds the information image, based on the embedding position selected at step S814.

At step S318, the image to which the information image is added is outputted in the same way as at step S316.

In the first to third embodiments, when the additional information multiplexing module 24 embeds the additional information (adding the information image), the top (first) information image may be made different from the other (i.e., second and following) information images to ensure synchronization. That is, the additional information multiplexing module 24 may add plural independent black pixels in order, for example, as the information image, if the additional information received from the additional information encoding module 21 is at the top. And the second and following information images are made one black pixel, as previously described. Also, the size of the black pixel may be different from the size of the other black pixels. Also, the information image may not be the black pixel, but the pixel of different color from the other information images.

Figure 9:
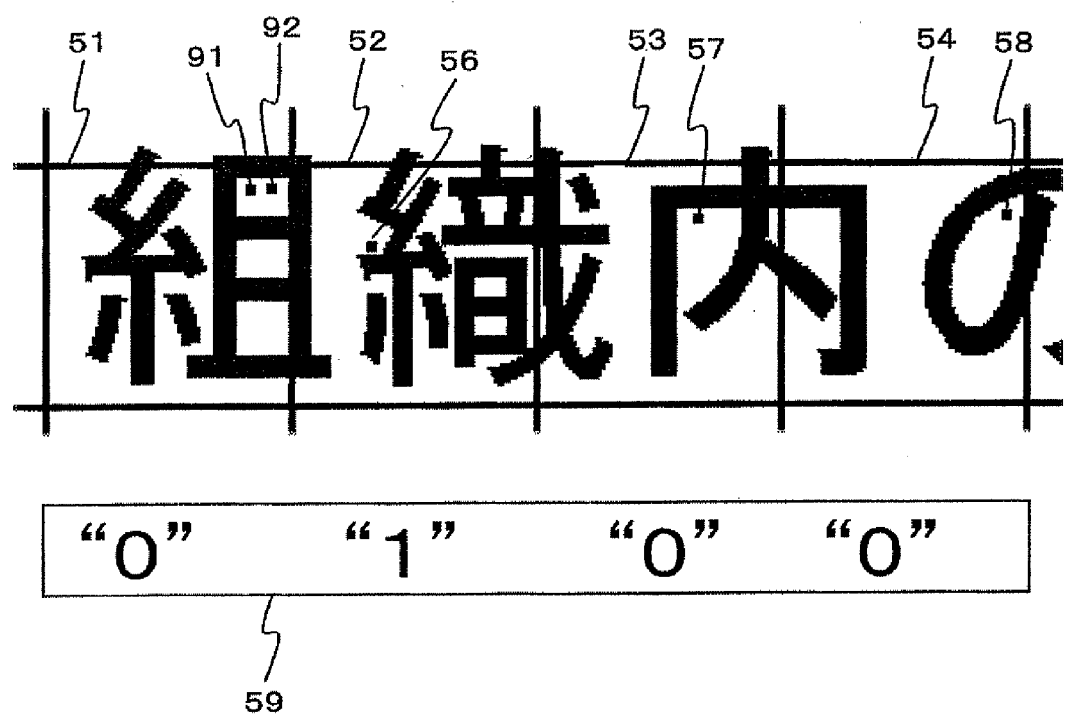
FIG. 9 is an explanatory view showing an example of image in which the top additional information is different from the other information image.

In the example as shown in FIG. 5 and previously described, an image example in the process in which the top information image is different from the other information images (plural black pixels) is shown in FIG. 9. In the example as shown in FIG. 9, to embed the additional information "0" at the top of the additional information of 4 bits of "0100", two black pixels (black pixels 91 and 92) are employed. Also, the black pixels 91 and 92 of the information pixels represent both meanings of "0" as additional information and the synchronization signal (start signal). Of course, if the additional information at the top is "1", two black pixels (black pixels 91 and 92) are added on to the reference pixel. Also, in embedding the second and following additional information, one black pixel (information image 56, 57, 58) is employed.

A fourth embodiment will be described below.

The fourth embodiment is a decoding device for decoding the additional information from the image to which the information image is added according to the first to third embodiments.

A conceptual module organization of a configuration example of the fourth embodiment is the same as the first embodiment shown in FIG. 1. The modules perform a process for decoding the additional information from the image.

Figure 10:
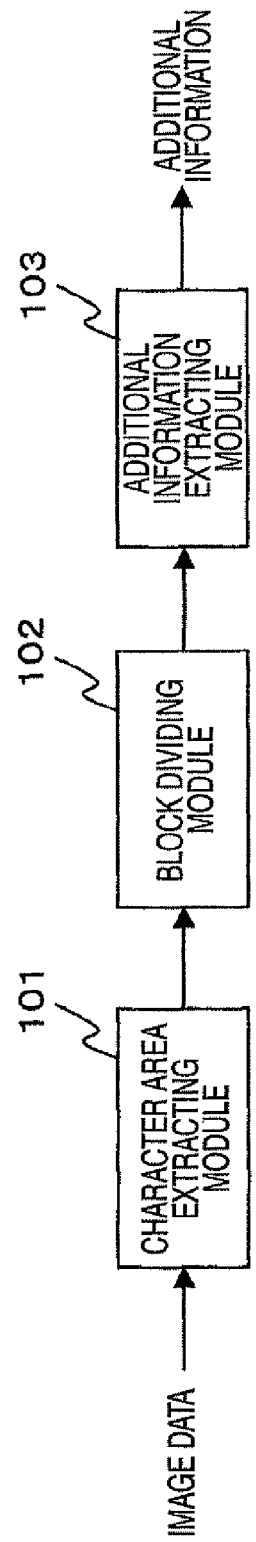
FIG. 10 is a conceptual module block diagram of a functional configuration example according to a fourth embodiment.

FIG. 10 is a conceptual module block diagram of a functional configuration example of the control module 11 according to the fourth embodiment.

The fourth embodiment comprises a character area extracting module 101, a block dividing module 102 and an additional information extracting module 103.

The character area extracting module 101, which is connected to the block dividing module 102, extracts a partial area judged as the character area from the input image data, and passes the extracted partial area to the block dividing module 102. That is, for example, the character area extracting module 101 extracts the partial area (image area into which the additional information is embedded) having a character-like feature from the input image data read by a scanner. For example, the partial area may be rectangular, and extracted by calculating the coordinates at four corners. The extraction of the partial area judged as the character area is specifically made by firstly extracting the area composed of binary values of black and white, based on the number of colors, further projecting the area to check whether or not the white ground area indicating the space between lines in the area exists almost regularly, and extracting the partial area regularly existing as the character area.

The block dividing module 102, which is connected to the character area extracting module 101 and the additional information extracting module 103, divides the character area extracted by the character area extracting module 101 into a predetermined block size, and passes the divided blocks to the additional information extracting module 103. More specifically, the blocks are allocated successively from the upper left corner of the character area, and the block is not allocated at the right end or lower end where the block is beyond the character area, for example.

The additional information extracting module 103, which is connected to the block dividing module 102, extracts the information added to the input image data, based on the positional relationship between the independent black pixel within the block extracted by the block dividing module 102 and the other black pixels, and outputs the extracted additional information. That is, the additional information extracting module 103 extracts the information from each block divided by the block dividing module 102. For example, specifically, the independent black pixel is searched from the block while skipping the block in which the number of black pixels within the block is less than or equal to a predetermined value, and whether the independent black pixel is nearer to the character component pixel in the upper direction or the character component pixel in the lower direction is determined, whereby "0" if the independent black pixel is nearer to the character component pixel in the upper direction, or "1" if it is nearer to the character component pixel in the lower direction is detected as the additional information. Finally, the additional information is decoded in error correcting system. Thereby, the original additional information is obtained.

Also, if the information image at the top is different from the other information images, the different information image (e.g., a plurality of black pixels) is firstly searched, and the second and following information image is extracted from the next block with the searched information image at the top to detect the additional information.

Figure 11:
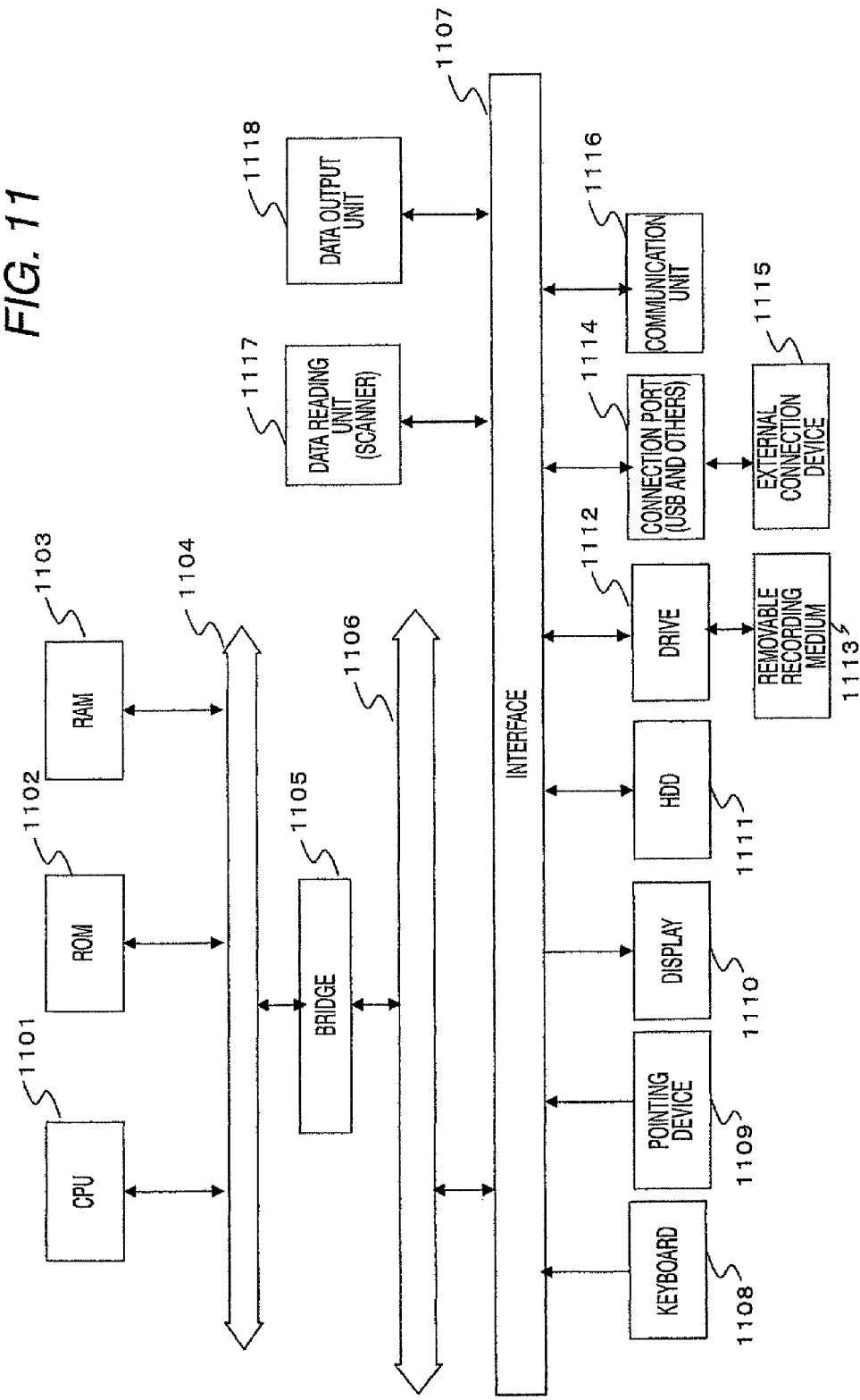
FIG. 11 is a block diagram showing a hardware configuration example of a computer that implements the first to fourth embodiments.

Referring to FIG. 11, a hardware configuration example in the previous embodiments will be described below. The hardware configuration example as shown in FIG. 11 is an image processing system composed of a personal computer (PC), for example, and has a data reading unit 1117 such as a scanner and a data output unit 1118 such as a printer.

A CPU (Central Processing Unit) 1101, which corresponds to various kinds of module, or the control module 11 as described in the previous embodiments, is a control part for performing the processing in accordance with a computer program describing an execution sequence of each of various kinds of modules such as the additional information encoding module 21, the character area extracting module 22, the block dividing module 23, the additional information multiplexing module 24, the image complexity analysis module 61, and the additional information extracting module 103.

A ROM (Read Only Memory) 1102 stores a program and the operation parameters for use in the CPU 1101. A RAM (Random Access Memory) 1103, which corresponds to the storage module 12, stores a program for use in execution of the CPU 1101, and the parameters properly changing during the execution. They are connected to each other via a host bus 1104 composed of a CPU bus.

The host bus 1104 is connected via a bridge 1105 to an external bus 1106 such as a PCI (Peripheral Component Interconnect/Interface) bus.

A keyboard 1108 and a pointing device 1109 such as a mouse, which correspond to the operation module 13, are input devices operated by the operator. A display 1110, which corresponds to the display module 14, is composed of a liquid crystal display unit or a CRT (Cathode Ray Tube) that displays various kinds of information as text or image information.

An HDD (Hard Disk Drive) 1111, which corresponds to the storage module 12, contains a hard disk and drives the hard disk to record or regenerate a program or information to be performed by the CPU 1101. The hard disk stores the image data of object and the image data to which the information image is added. Moreover, it stores other various data processing programs and various computer programs.

A drive 1112 reads data or a program recorded on a removable recording medium 1113 such as a magnetic disk, an optical disk, a magneto-optical disk or a semiconductor memory mounted, and supplies the data or program to the RAM 1103 connected via an interface 1107, the external bus 1106, the bridge 1105 and the host bus 1104. The removable recording medium 1113 is usable as a data recording area in the same way as the hard disk.

A connection port 1114 connects an external connection device 1115, and has a connection portion such as a USB or IEEE 1394. The connection port 1114 is connected via the interface 1107, the external bus 1106, the bridge 1105 and the host bus 1104 to the CPU 1101. A communication unit 1116 is connected to the network and performs a data communication process with the outside. The data reading unit 1117, which corresponds to the input/output module 15, is a scanner, for example, and performs an image reading process. The data output unit 1118, which corresponds to the input/output module 15, is a printer, for example, and performs an output process for image data.

The hardware configuration as shown in FIG. 11 is one configuration example, and the previous embodiments are not limited to the configuration as shown in FIG. 11, but may be any configuration that can perform the modules as described in the previous embodiments. For example, some modules may be composed of the dedicated hardware (e.g., Application Specific Integrated Circuit: ASIC), some modules may reside in an external system, connected via the communication line, or a plurality of systems as shown in FIG. 11 may be connected to each other via the communication line to operate in cooperation with each other. Also, it may be incorporated into a copying machine, a facsimile, a scanner, a printer, or a multi-function device (image processing device having two or more functions of scanner, printer, copier and facsimile).

Though the first to fourth embodiments have been described above, the first to third embodiments and the fourth embodiment may be combined. That is, the image processing apparatus may have both the abilities of embedding the additional information into the image and decoding the additional information from the image. In this case, the character area extracting module 91 of the fourth embodiment extracts the image area within the image outputted from the image output module 25.

Through the relative position between the information image and the character component pixel has been taken as an example of the position of the black pixel (information image) representing the information to be embedded into the image using FIGS. 4 and 5, the additional information may be represented with a difference in the distance between the information image and the character component pixel (e.g., represented in the number of dots or millimeter at a certain resolution). For example, the distance is within one millimeter if "0", or two millimeters or more if "1". Also, it may be a combination of the relative position and the distance. For example, the distance may be varied with the upper or lower relative position.

Though the character area as the image area to embed the additional information and the character component pixel as the reference of the position to embed the additional information have been exemplified in the previous embodiments, the line-work may be used.

Also, though the additional information is embedded into every block in the previous embodiments, the additional information may be embedded into every plural blocks. The unit of object to embed is not the block, but may be the character image, the pixel cluster, or the cell within the table in the case of the line-work such as table, for example.

Also, though information is not embedded into the block within which the number of black pixels is less than a predetermined number by skipping it in the previous embodiments, the complexity of the black pixels within the block may be calculated and the information may not be embedded if the black pixels are not complex.

Also, though the black pixel as the reference pixel, the black pixel group as the pixel cluster, and the black pixel as the pixel to be added have been exemplified in the previous embodiments, the color of the reference pixel, the pixel cluster and the pixel to be added is not necessarily limited to black, but may be white, or any other colors (blue, gray and so on).

Also, though the rectangular block has been exemplified as the demarcation of area, the demarcation is not necessary to be rectangular block, but may be the boundary for dividing the area, or any other shape or boundary line.

The program as described above may be provided by storing it in the recording medium, or by distributing it via the communication means. In this case, for example, the program as described above may be grasped as the invention of a "computer readable recording medium recording the program".

The "computer readable recording medium recording the program" means the recording medium on which the program is recorded that can be read on the computer, used for installing, executing or circulating the program.

Example of the recording medium may include a digital versatile disk (DVD), for example, "DVD-R, DVD-RW, DVD-RAM" that are the standards settled by the DVD forum or "DVD+R, DVD+RW" that are the standards settled by the DVD+RW, compact disk (CD), read only memory (CD-ROM), CD recordable (CD-R), CD rewritable (CD-RW), magneto-optical disk (MO), flexible disk (FD), magnetic tape, hard disk, read only memory (ROM), electrically erasable and programmable read only memory (EEPROM), flash memory, and random access memory (RAM).

And all or a part of the program may be recorded in the recording medium, and retained or circulated. Also, it may be transmitted through the communication, using the transmission media such as a wire network or a wireless network for use in a local area network (LAN), metropolitan area network (MAN), wide area network (WAN), internet, intranet, extranet, or a combination thereof, or carried over the carrier wave.

Moreover, the program as previously described may be a part of another program, or recorded in the recording medium, together with a distinct program. The program may be recorded in a plurality of recording media by dividing it. Also, it may be recorded in any form, compressed or encoded, as far as recoverable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
at least one processor; and
at least one memory, the memory storing instructions that when executed cause the at least one processor to function as:
an image accepting unit that accepts an image;
an information accepting unit that accepts additional information to be added to the image and encodes the additional information into a binary code;
a pixel addition unit that specifies a reference pixel for reference based on a demarcation, the demarcation being each object area within the image accepted by the image accepting unit or each sub-area into which the object area is divided, and that adds a pixel at a position within the image relative to the reference pixel, the position of the added pixel within the image being determined based upon a corresponding digit in the binary code; and
an output unit that outputs the image to which the pixel is added by the pixel addition unit.

2. The image processing apparatus as claimed in claim 1, wherein
the pixel addition unit determines the position of the pixel to be added based on a distance from the reference pixel.

3. The image processing apparatus as claimed in claim 1, wherein
the pixel addition unit specifies the reference pixel at a position that does not overlap the demarcation, in a case where a plurality of the reference pixels are specified.

4. The image processing apparatus as claimed in claim 1, the memory further storing instructions that when executed cause the at least one processor to further function as:
a complexity calculation unit that calculates the complexity for each object area accepted by the image accepting unit or each sub-area into which the object area is divided,
wherein
the pixel addition unit adds the pixel by specifying the reference pixel, based on the complexity calculated by the complexity calculation unit, in a case where a plurality of the reference pixels are specified.

5. The image processing apparatus as claimed in claim 4, wherein
the pixel addition unit decides whether or not to add the pixel based on the complexity calculated by the complexity calculation unit.

6. The image processing apparatus as claimed in claim 4, the memory further storing instructions that when executed cause the at least one processor to further function as:
an extraction unit that extracts a character area from the image; and
a recognition unit that recognizes the character area extracted by the extraction unit,
wherein
the complexity calculation unit calculates the complexity for each object area within the image accepted by the image accepting unit or each sub-area into which the object area is divided, based on the recognition result by the recognition unit.

7. The image processing apparatus as claimed in claim 1, wherein
the pixel addition unit has a top pixel to be added different from other pixels to be added.

8. An image processing apparatus comprising:
at least one processor; and
at least one memory, the memory storing instructions that when executed cause the at least one processor to function as:
an image accepting unit that accepts an image;
an information accepting unit that accepts additional information to be added to the image and encodes the additional information into a binary code;
a pixel addition unit that specifies a reference pixel for reference based on a demarcation, the demarcation being each object area within the image accepted by the image accepting unit or each sub-area into which the object area is divided, and that adds a pixel at a position within the image relative to the reference pixel, the position of the added pixel within the image being determined based upon a corresponding digit in the binary code;
an output unit that outputs the image to which the pixel is added by the pixel addition unit;
an area extraction unit that extracts an image area within the image outputted by the output unit; and
an information extraction unit that extracts information added to the image based on a positional relationship between an independent pixel and other pixels within the image area extracted by the area extraction unit.

9. A non-transitory computer readable medium storing a program causing a computer to execute a process for performing an image processing, the process comprising:
accepting an image;
accepting additional information to be added to the image;
encoding the additional information into a binary code;
specifying a reference pixel for reference based on a demarcation, the demarcation being each object area within the image accepted by the image accepting unit or each sub-area into which the object area is divided, determining a position to add a pixel within the image based upon a corresponding digit in the binary code, and adding the pixel at the position within the image relative to the reference pixel; and
outputting the image to which the pixel is added by the pixel addition unit.

10. A non-transitory computer readable medium storing a program causing a computer to execute a process for performing an image processing, the process comprising:
accepting an image;
accepting additional information to be added to the image;
encoding the additional information into a binary code;
specifying a reference pixel for reference based on a demarcation, the demarcation being each object area within the image accepted by the image accepting unit or each sub-area into which the object area is divided, determining a position to add a pixel within the image based upon a corresponding digit in the binary code, and adding the pixel at the position within the image relative to the reference pixel;
outputting the image to which the pixel is added;
extracting an image area within the outputted image; and
extracting information added to the image based on a positional relationship between an independent pixel and other pixels within the extracted image area.

11. The image processing apparatus as claimed in claim 1, wherein the position of the added pixel is above or below of the reference pixel depending on a value of the binary code.

12. The image processing apparatus as claimed in claim 11, wherein the position of the added pixel is above the reference pixel when the value of the binary code is equal to 1, and
the position of the added pixel is below the reference pixel when the value of the binary code is equal to 0.

13. The image processing apparatus as claimed in claim 11, wherein the position of the added pixel is above the reference pixel when the value of the binary code is equal to 0, and
the position of the added pixel is below the reference pixel when the value of the binary code is equal to 1.

14. The image processing apparatus as claimed in claim 1, wherein the position of the added pixel is above or below of the reference pixel depending on a value of the binary code.

15. The image processing apparatus as claimed in claim 14, wherein the position of the added pixel is above the reference pixel when the value of the binary code is equal to 1, and
the position of the added pixel is below the reference pixel when the value of the binary code is equal to 0.

16. The image processing apparatus as claimed in claim 14, wherein the position of the added pixel is above the reference pixel when the value of the binary code is equal to 0, and
the position of the added pixel is below the reference pixel when the value of the binary code is equal to 1.

17. The non-transitory computer readable medium of claim 9,
wherein determining a first position to add the pixel comprises
determining a first position if a value of the binary code is 0, and
determining a second position that is different from the first position if a value if the binary code is 1.

18. The non-transitory computer readable medium of claim 10,
wherein determining a first position to add the pixel comprises
determining a first position if a value of the binary code is 0, and
determining a second position that is different from the first position if a value if the binary code is 1.

* * * * *